Sept. 26, 1950     I. GREENE     2,523,695
VEHICLE TIRE
Filed March 10, 1948.
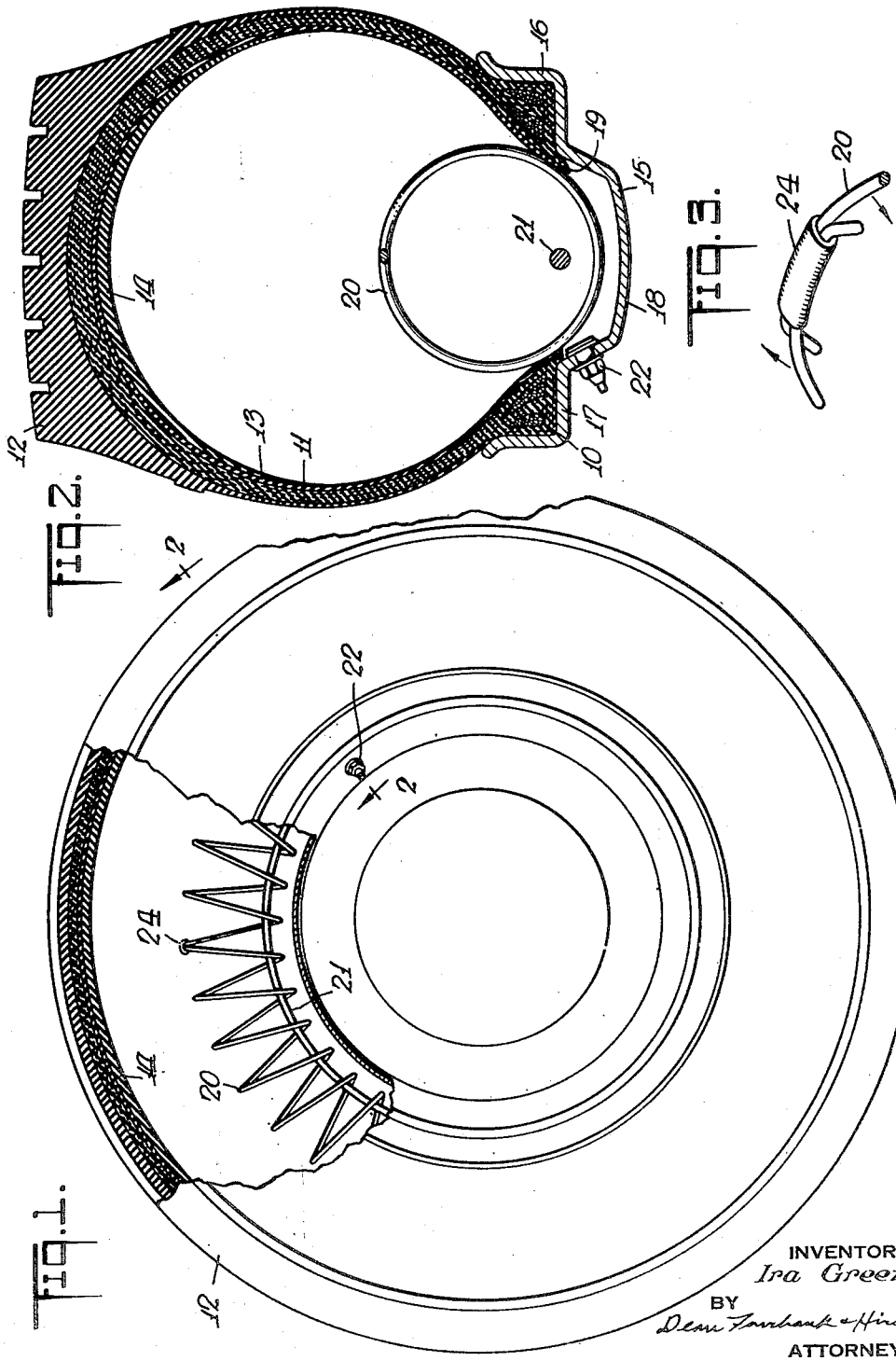

Patented Sept. 26, 1950

2,523,695

UNITED STATES PATENT OFFICE 2,523,695

VEHICLE TIRE

Ira Greene, Brooklyn, N. Y.

Application March 10, 1948, Serial No. 13,959

2 Claims. (Cl. 152—400)

1

This invention relates to inflatable tires for vehicles and has for its main object to so construct the casing and so clamp it to the rim that the casing and rim will retain the air under pressure even though the casing be punctured and without the need for an inner tube.

As important features of my invention, an annular coil spring is employed within the casing for forcing portions of the beads of the casing tightly against the rim to form air-tight joints; the inner surface of the casing is covered with a layer of an impervious material so that leakage of air through the casing wall is prevented; the beads of the casing engage with the rim and prevent leakage of air between the beads and the casing; and the inner surface of the tread portion is provided with a layer of soft noncured gum or other plastic material which will close any puncture formed in the tread and prevent leakage through the puncture.

In the accompanying drawing:

Fig. 1 is a side elevation of a tire and rim embodying my invention, a portion of the casing being shown in section;

Fig. 2 is a section on the line 2—2 of Fig. 1 and on a somewhat larger scale; and Fig. 3 is a perspective view of the connection between the ends of the wire forming the coil spring.

My improved tire may be formed of rubber and canvas or cords and in general shape and size may be similar to any standard tire casing with its reinforced beads or base flanges 10, side walls 11 and tread portion 12; and the casing may be made by any standard method of manufacture. In my improved tire the inner surface of the casing is provided with an impervious layer 13 of cured rubber or other material so as to prevent leakage of air therethrough when the tire is inflated. This may be incorporated in the making of the casing. In addition thereto there is provided an inner layer 14 extending across the full width of the tread portion and formed of a soft plastic such as non-cured and non-curable gum which will be forced by air pressure into any hole formed by a nail or other puncture-producing member. This layer is incorporated after the casing has been made by any standard procedure and this layer is soft enough to flow into and completely close any hole upon the removal of a nail or other puncture-producing member when such a member is pulled out. Thus the removal of a nail or other puncturing member does not cause deflation of the tire.

The tire is adapted to be mounted on a rim 15

2 which may be an integral part of the wheel or may be detachable therefrom. This rim has the usual side flanges 16 which limit the extent to which the beads may be forced apart, seats or shoulders or seating surfaces 17 upon which the beads of the tire rest, and a central drop well or annular channel 18, as is usual in rims for heavy-duty tires.

In my improved construction the surfaces of the beads facing inwardly toward the axis of the wheel are wider than the shoulders 17 of the rim and this greater width is provided by opposed soft or plastic flexible flaps, flanges or extensions 19 on the beads so that these flanges extend slightly across the channel 15 of the rim. Within the casing there is provided an annular coil spring 20, the diameter of the convolutions of the coil being substantially less than the internal diameter of the air chamber within the casing and somewhat greater than the distance between the beads of the casing so that the spring cannot go into the well or channel sufficiently far to contact the bottom thereof. The inner diameter of the annular coil is such that the convolutions of the spring will resiliently press the flanges or flaps 19 of the beads downwardly into air-tight sealing engagement with the side walls of the channel or well 15. Thus there is no contact between the coil spring and the rim but the coil spring clamps portions of the beads or base flanges of the tire tightly against the rim to prevent any leakage of air from the interior outwardly between the casing and the rim. The convolutions are shown as circular but this is not essential.

Within the coil spring there is preferably provided a flexible rod or heavy wire in the form of a ring 21 which is of slightly larger diameter than the inner side of the coil spring. It may be of single or multiple strand and must be of such length that when one part is positioned inward toward the center of the wheel in the well, the opposite portion may be slipped over the outer edge of the side flange in mounting the casing on the rim. In assembling, one bead is placed in the bottom of the well and while the other bead is spaced axially from the rim flange. The annular coil spring is forced over the last mentioned rim flange and into the casing and the other bead is then forced over the flange and onto the rim, as is common practice in assembling a tire casing and an inner tube. The spring will then contract to engage the parts 19 and press them against the rim.

One of the functions of the annular ring 21 is to limit the outer radial movement of the coil spring under the action of centrifugal force and to maintain the spring against any substantial outward movement in case the coil spring should break. The ends of the wire forming the coil spring are secured together in such a way that tension or strain on the spring will not tend to break or dislodge the connecting means. As shown, the ends of the coil spring cross each other and are held by a sleeve or clamp 24 so that tension on the spring parts will be in the direction of the arrows in Fig. 3 and no strain will be placed on the clamp which holds the ends together.

For inflating the tire a valve stem is mounted on the rim because no inner tube is employed. As shown, this valve stem 22 may be mounted on a side wall of the channel of the rim so as to be readily accessible and at the same time be below the edge of the flaps or extensions 19 on the bead portions of the tire, so that these extensions will not interfere with the proper operation of the valve.

It will be obvious that many changes may be made in the details without departing from the scope of my invention as defined in the appended claims.

Having thus described my invention, what I claim as new and desire to secure by Letters Patent is:

1. In combination, a vehicle wheel rim having tire seats and a drop center well therebetween, a tire casing having an impervious wall, beads on said seats and flexible flanges on said beads and extending into said well, an annular coil spring within said casing, the diameter of the coils being somewhat greater than the width of said well whereby said coils extend part-way into said well to press said flanges into sealing engagement with the sides of said well and are spaced from the bottom of said well, and a ring encircled by said coils and permitting limited radial movement of said coils.

2. A construction as defined in claim 1, and in which the casing has an inner layer of soft puncture closing material.

IRA GREENE.

REFERENCES CITED

The following references are of record in the file of this patent:

UNITED STATES PATENTS

| Number | Name | Date |
|---|---|---|
| 1,253,960 | Grewe | Jan. 15, 1918 |
| 1,880,489 | Roberts | Oct. 4, 1932 |
| 1,982,135 | Daddio | Nov. 27, 1934 |